United States Patent
Johnson et al.

(10) Patent No.: US 11,580,627 B2
(45) Date of Patent: Feb. 14, 2023

(54) SYSTEMS AND METHODS FOR AUTOMATICALLY GRADING PRE-OWNED ELECTRONIC DEVICES

(71) Applicant: Assurant, Inc., New York, NY (US)

(72) Inventors: Brandon P. Johnson, Brentwood, TN (US); Roscoe R. Herald, Murfreesboro, TN (US); Harrison A. Hanks, Nashville, TN (US); Carson Farley, Smyna, TN (US)

(73) Assignee: Assurant, Inc., New York, NY (US)

( * ) Notice: Subject to any disclaimer, the term of this patent is extended or adjusted under 35 U.S.C. 154(b) by 82 days.

(21) Appl. No.: 17/141,919

(22) Filed: Jan. 5, 2021

(65) Prior Publication Data

US 2021/0209746 A1  Jul. 8, 2021

Related U.S. Application Data

(60) Provisional application No. 62/957,795, filed on Jan. 6, 2020.

(51) Int. Cl.
*G06V 20/10* (2022.01)
*G06T 7/00* (2017.01)

(52) U.S. Cl.
CPC .......... *G06T 7/0004* (2013.01); *G06V 20/10* (2022.01); *G06T 2207/10152* (2013.01); *G06T 2207/30121* (2013.01); *G06T 2207/30242* (2013.01)

(58) Field of Classification Search
CPC ......... G06T 7/0004; G06T 2207/10152; G06T 2207/30121; G06T 2207/30242; G06V 20/10; G01N 21/9515; G01N 2021/9513

(Continued)

(56) References Cited

U.S. PATENT DOCUMENTS 10,269,110 B2 * 4/2019 Forutanpour ........... G06T 7/001
2016/0171456 A1 6/2016 Bowles
(Continued)

FOREIGN PATENT DOCUMENTS

| KR | 10-2019-0107593 A | 9/2019 |
| KR | 10-2020-0115308 A | 10/2020 |
| WO | 2017/081527 A1 | 5/2017 |

OTHER PUBLICATIONS

English language translation KR patent publication 10-2019-0107593, dated Sep. 20, 2019 (Year: 2019).*

(Continued)

*Primary Examiner* — Sheela C Chawan
(74) *Attorney, Agent, or Firm* — Alston & Bird LLP

(57) ABSTRACT

Systems and methods for automatically grading a user device are provided. Such systems and methods can include (1) a lighting element positioned at an angle relative to a platform, (2) an imaging device positioned at the angle relative to the platform such that light emitted from the lighting element and a field of view of the imaging device form a right angle where the light emitted from the lighting element and the field of view meet at a user device when the user device is positioned at a predetermined location on the platform, and (3) control circuitry that can activate the lighting element, instruct the imaging device to capture an image of a screen of the user device while the user device is at the predetermined location and is being illuminated by the first lighting element, and parse the image to determine whether the screen is damaged.

23 Claims, 13 Drawing Sheets

(58) Field of Classification Search
USPC ....... 382/100, 141, 149, 151, 152, 153, 189,
382/190, 214, 274, 275, 305, 307
See application file for complete search history.

(56) References Cited

U.S. PATENT DOCUMENTS

| | | | | |
|---|---|---|---|---|
| 2016/0335616 | A1 | 11/2016 | Bordeleau et al. | |
| 2017/0372465 | A1* | 12/2017 | Forutanpour | G06V 10/42 |
| 2018/0165541 | A1* | 6/2018 | Amico | H04N 5/23293 |
| 2019/0073641 | A1* | 3/2019 | Utke | G06K 9/6271 |
| 2019/0385275 | A1* | 12/2019 | Kikuchi | G06T 7/0004 |

OTHER PUBLICATIONS

International Search Report and Written Opinion from corresponding WO application PCT/US2021/012338, dated Mar. 24, 2021.
English language translation of KR patent publication 10-2019-0107593, dated Sep. 20, 2019.
English language translation of KR patent publication 10-2019-0107593, dated Oct. 7, 2020.

* cited by examiner

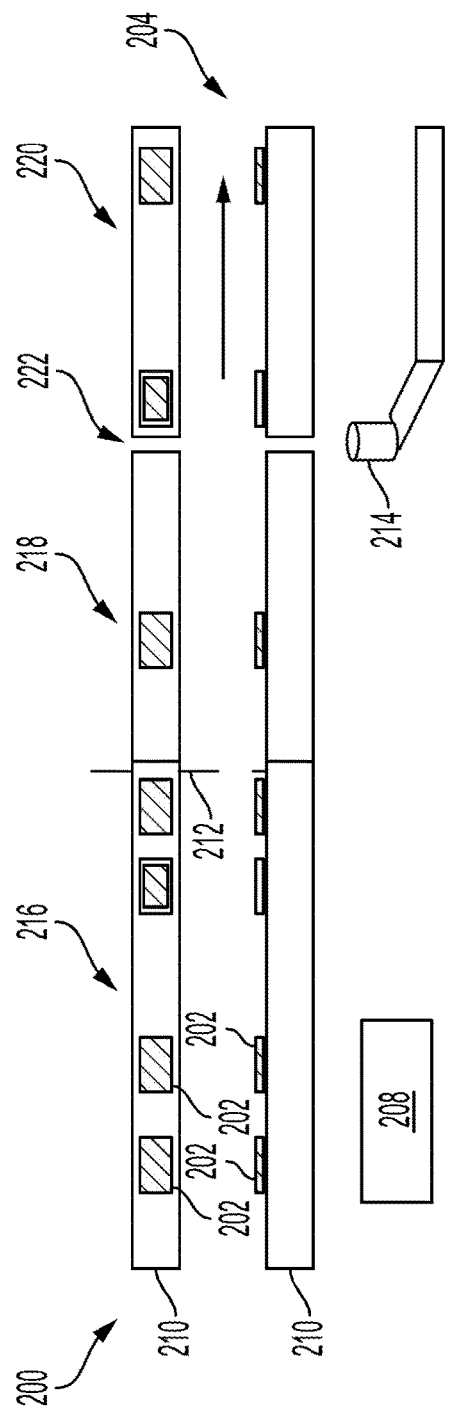
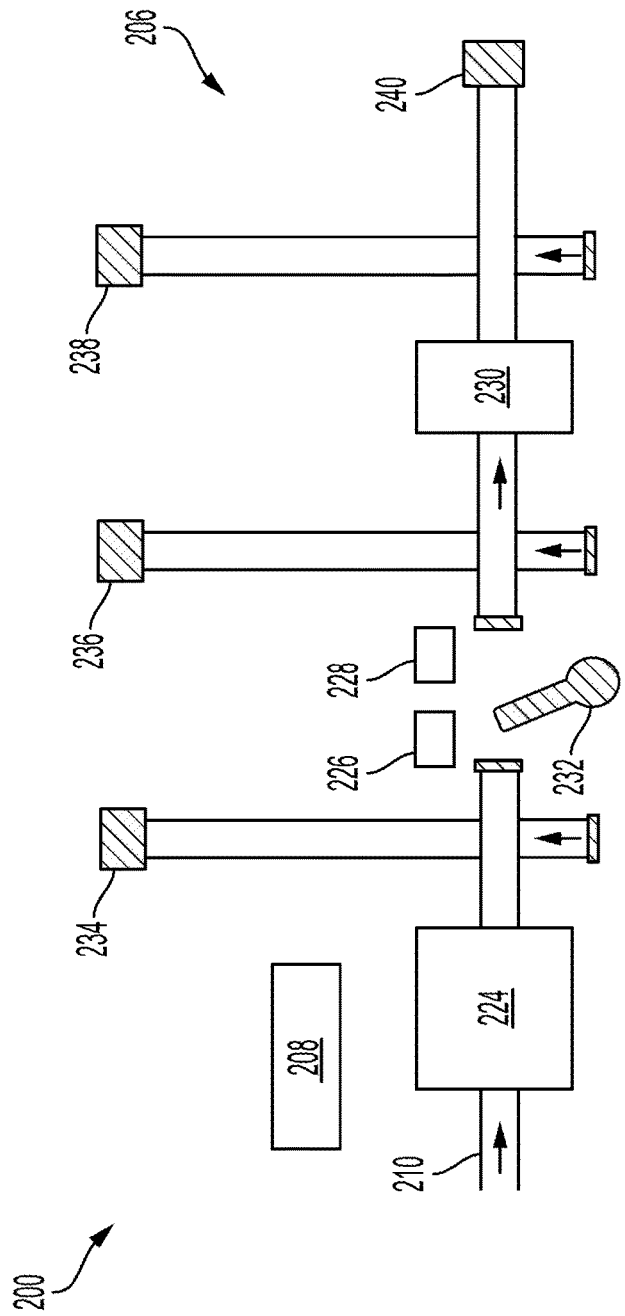
FIG. 2
FIG. 3

SYSTEMS AND METHODS FOR AUTOMATICALLY GRADING PRE-OWNED ELECTRONIC DEVICES

CROSS REFERENCE TO RELATED APPLICATIONS

This application claims priority to U.S. Application No. 62/957,795 filed Jan. 6, 2020 and titled "SYSTEMS AND METHODS FOR AUTOMATICALLY GRADING PRE-OWNED ELECTRONIC DEVICES." U.S. Application No. 62/957,795 is hereby fully incorporated by reference as if set forth fully herein.

FIELD

The present invention relates generally to grading pre-owned electronic devices. More particularly, the present invention relates to systems and methods for automatically grading pre-owned electronic devices.

BACKGROUND

Known systems and methods for grading pre-owned electronic devices employ manual labor to inspect, sort, and grade the pre-owned electronic devices for either resale or recycling. However, extensive use of such manual labor can be costly, slow, and inaccurate. Additionally, such known systems and methods often fail to capture high quality and/or standardized images of the pre-owned electronic devices, which can prolong and frustrate customer quality disputes.

In view of the above, there is a need and an opportunity for improved systems and methods.

BRIEF DESCRIPTION OF THE DRAWINGS

FIG. 2 is a schematic diagram of a portion of a multi-stage automated assembly line system according to disclosed embodiments;

FIG. 3 is a schematic diagram of a portion of a multi-stage automated assembly line system according to disclosed embodiments;

DETAILED DESCRIPTION

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Figure 1:
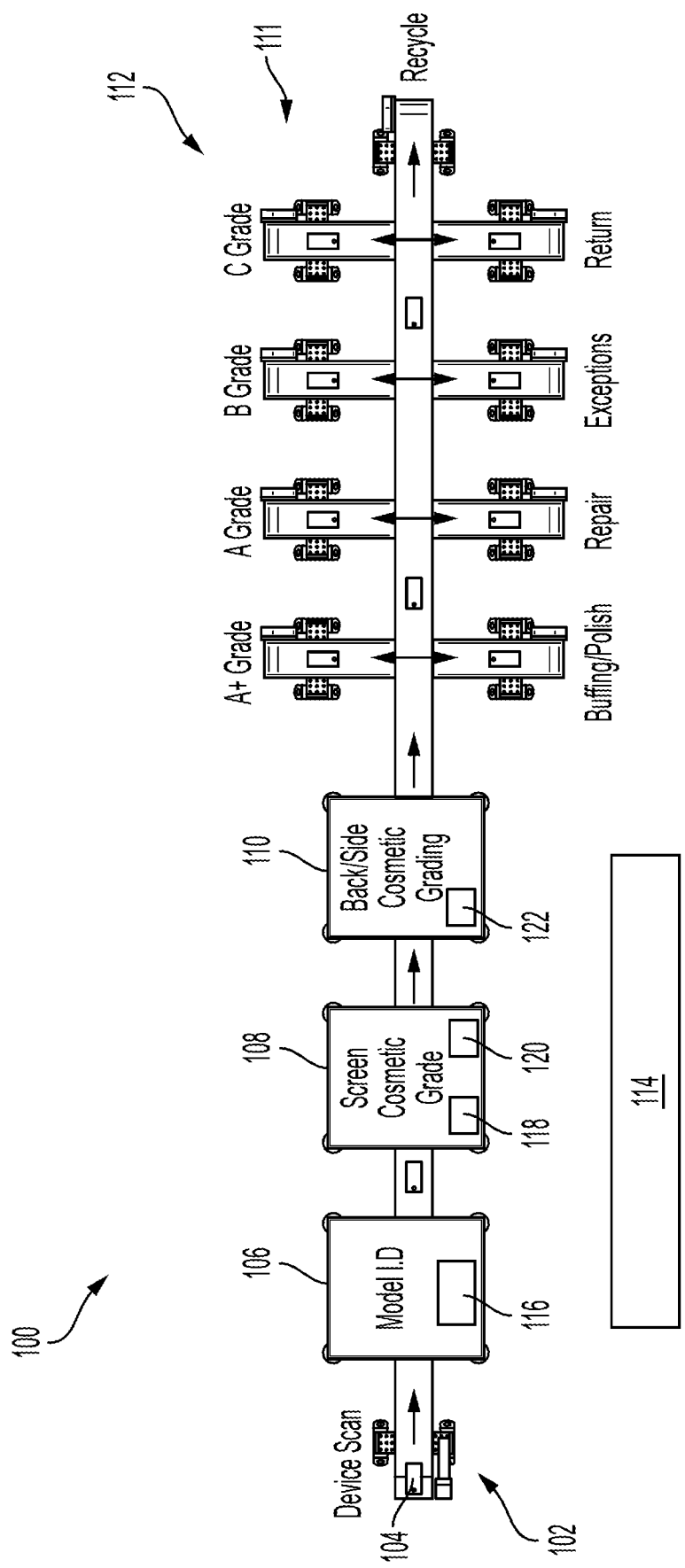
FIG. 1 is a schematic diagram of a multi-stage automated assembly line system according to disclosed embodiments.

Embodiments disclosed herein can include systems and methods for automatically grading pre-owned electronic devices or other user devices, such as, for example, mobile phones. As seen in FIG. 1, in some embodiments, systems and methods disclosed herein can include a multi-stage automated assembly line system 100 that can sort and grade the pre-owned electronic devices.

As also seen in FIG. 1, in some embodiments, the multi-stage automated assembly line system 100 can include multiple assembly line stations, systems, and/or devices for executing one or more tasks to grade the pre-owned electronic devices. For example, in some embodiments, a first station 102 of the multiple assembly line stations can scan a bar code, a QR code, or the like associated with one of the pre-owned electronic devices 104, a second station 106 of the multiple assembly line stations can identify a model ID of the one of the pre-owned electronic devices 104, a third station 108 of the multiple assembly line stations can grade a screen and/or a camera of the one of the pre-owned electronic devices 104, a fourth station 110 of the multiple assembly line stations can grade a back and/or sides of the one of the pre-owned electronic devices 104, and a sorting station 111 of the multiple assembly line stations can distribute the one of the pre-owned electronic devices 104 to one of a plurality of output stations 112 based on assessments in or from some or all of the multiple assembly line stations.

Various systems and methods for moving the pre-owned electronic devices through the multi-stage automated assembly line system 100 are contemplated. For example, in some embodiments, conveyor belts as known in the art can move the pre-owned electronic devices through the multi-stage automated assembly line system 100, and in some embodiments, a movable tote can move the pre-owned electronic devices through the multi-stage automated assembly line system 100.

As described above, the first station 102 can scan the bar code or another electronic identifier associated with the one of the pre-owned electronic devices 104, for example, with a scanning device. When the bar code or the other electronic identifier is scanned, control circuitry 114 of the multi-stage automated assembly line system 100 in communication with the first station 102 can identify and load preliminary information associated with the one of the pre-owned electronic devices 104 from the bar code or the other electronic identifier. In some embodiments, the preliminary information associated with the one of the pre-owned electronic devices 104 can include a manufacturer of the one of the pre-owned electronic devices 104, a customer ID associated with the one of the pre-owned electronic devices 104, usage data for the one of the pre-owned electronic devices 104, a model of the one of the pre-owned electronic devices 104, a provisional grade for the one of the pre-owned electronic devices 104, and/or other types of information as would be known or desired by one of ordinary skill in the art. Furthermore, in some embodiments, others of the multiple assembly line stations can subsequently add to and/or augment the preliminary information associated with the one of the pre-owned electronic devices 104. For example, in some embodiments, responsive to the first station 102 scanning the bar code or the other electronic identifier, the control circuitry 114 can generate a database entry in a database that initially contains the preliminary information associated with the one of the pre-owned electronic devices 104, that is, the preliminary information identified from the bar code or the other electronic identifier, and the others of the multiple assembly line stations can save additional information associated with the one of the pre-owned electronic devices 104 into the database entry.

As described above, the second station 106 can identify the model ID of the one of the pre-owned electronic devices 104. For example, in some embodiments, the control circuitry 114 in communication with the second station 106 can use the preliminary information associated with the one of the pre-owned electronic devices 104 to identify the manufacturer and/or the model of the one of the pre-owned electronic devices 104 and, responsive thereto, identify a set of possible options for the model ID of the one of the pre-owned electronic devices 104.

Various embodiments for identifying the manufacturer, the model, and/or the model ID of the one of the pre-owned electronic devices 104 are contemplated. For example, in some embodiments, the first station 102 or the second station 106 can include an imaging device 116 that can capture a first image of the one of the pre-owned electronic devices 104, and the control circuitry 114 can process the first image of the one of the pre-owned electronic devices 104 to identify the manufacturer, the model, and/or the model ID of the one of the pre-owned electronic devices 104. In some embodiments, the control circuitry 114 can compare the first image of the one of the pre-owned electronic devices 104 to a first series of pre-stored reference images for which the manufacturer, the model, and/or the model ID is known, can identify one of the first series of pre-stored reference images that best matches the first image of the one of the pre-owned electronic devices 104, and can assign to the one of the pre-owned electronic devices 104 the manufacturer, the model, and/or the model ID associated with the one of the first series of pre-stored reference images that best matches the first image of the one of the pre-owned electronic devices 104.

Additionally or alternatively, in some embodiments, the control circuitry 114 can parse the first image of the one of the pre-owned electronic devices 104 to identify visual identifying details of the one of the pre-owned electronic devices 104, such as a size of the one of the pre-owned electronic devices 104, a location of the screen of the one of the pre-owned electronic devices 104, and locations and sizes of other elements of the one of the pre-owned electronic devices 104, such as cameras and buttons. Then, the control circuitry 114 can compare the visual identifying details to identifying information of known electronic devices to identify the manufacturer, the model, and/or the model ID of the one of the pre-owned electronic devices 104.

Additionally or alternatively, in some embodiments, the control circuitry 114 can execute a device recognition artificial intelligence ("AI") program or algorithm to identify the manufacturer, the model, and/or the model ID of the one of the pre-owned electronic devices 104. For example, in a training mode, the device recognition AI program or algorithm can be trained to identify the pre-owned electronic devices, for example, by feeding the device recognition AI program or algorithm with captured images, sensor scan data, and/or the identifying information of the known electronic devices and, responsive thereto, provide positive and negative feedback for device identifications made by the device recognition AI program or algorithm. Based on the positive and negative feedback, the device recognition AI program or algorithm can develop rules and heuristics that can be used to identify the manufacturer, the model, and/or the model ID of one of the pre-owned electronic devices 104 when operating outside of a training mode.

As described above, the third station 108 can grade the screen and/or the camera of the one of the pre-owned electronic devices 104, for example, by determining whether or to what degree the screen and/or a lens of the camera of the one of the pre-owned electronic devices 104 is cracked. In some embodiments, the control circuitry 114 in communication with the third station 108 can use the preliminary information associated with the one of the pre-owned electronic devices 104 and the manufacturer, the model, and/or the model ID of the one of the pre-owned electronic devices 104 to grade the screen and/or the camera of the one of the pre-owned electronic devices 104. For example, in some embodiments, the control circuitry 114 can use the manufacturer, the model, and/or the model ID of the one of the pre-owned electronic devices 104 to transmit instructions for the third station 108 or positioning elements therein to position lighting elements 118 and an imaging device 120 associated with the third station 108 and adjust parameters of the lighting elements 118 and the imaging device 120 so that any cracks in the screen and/or the lens of the camera of the one of the pre-owned electronic devices 104 can be identified without powering on the one of the pre-owned electronic devices 104 and so that an area of the one of the pre-owned electronic devices 104 that the imaging device 120 captures is limited to only that area needed to identify such cracks.

Various embodiments of the lighting elements 118 are contemplated. For example, in some embodiments, the lighting elements 118 can include ultraviolet light emitting elements. Additionally or alternatively, in some embodiments, the lighting elements 118 can include non-ultraviolet lighting elements that can be used independently or in connection with the ultraviolet light emitting elements. Additionally or alternatively, in some embodiments, the lighting elements 118 can include multiple, for example, three, separate light elements with variable intensities that can be adjusted by the control circuitry 114 based on the manufacturer, the model, and/or the model ID of the one of the pre-owned electronic devices 104. For example, a first of the lighting elements 118 can include a large planar lighting element positioned at an angle with respect to a section of the conveyor belt or the movable tote within the third station 108 and closest to a first end at which the one of the pre-owned electronic devices 104 enters the third station 108. Then, a second of the lighting elements 118 can be positioned below the conveyor belt or the movable tote, include a width greater than the conveyor belt or the movable tote, and be used to illuminate the one of the pre-owned electronic devices 104 from below, and in these embodiments, the conveyor belt or the movable tote can be at least partially transparent. Finally, a third of the lighting elements 118 can be vertically closer to the conveyor belt or the movable tote than the first of the lighting elements 118 at an opposite end of the third station 108 from the first of the lighting elements 118.

In some embodiments, different configurations and numbers of the lighting elements 118 can be employed in the third station 108. For example, in some embodiments, a physical configuration, optical characteristics, and timing characteristics of the lighting elements 118 can be altered and optimized for use in connection with different screen types of the pre-owned electronic devices, such as LED-type screens, to facilitate optimized accuracy, for example, greater than 98% accuracy, when grading the screen of the one of the pre-owned electronic devices 104. In particular, the control circuitry 114 can account for changes to and optimizations of polarization patterns, refraction anomalies, exposure rates, and speeds of the lighting elements 118 to facilitate increased production rates when identifying the cracks in the LED-type screens versus LCD-type screens.

Various embodiments for grading the screen and/or the camera of the one of the pre-owned electronic devices 104 are contemplated. For example, in some embodiments, the imaging device 120 can capture a second image of the one of the pre-owned electronic devices 104 while the lighting elements 118 are illuminating the one of the pre-owned electronic devices 104, and the control circuitry 114 can process the second image of the one of the pre-owned electronic devices 104 to identify the cracks in the screen or the lens of the camera of the one of the pre-owned electronic devices 104. In some embodiments, the control circuitry 114 can compare the second image of the one of the pre-owned electronic devices 104 to a second series of pre-stored reference images for which the manufacturer, the model, and/or the model ID matches the manufacturer, the model, and/or the model ID of the one of the pre-owned electronic devices 104, and in these embodiments, each of the second series of pre-stored reference images can include a cracked screen, a cracked camera lens, an uncracked screen, an uncracked camera lens, and combinations thereof. Based on such a comparison, the control circuitry 114 can identify one of the second series of pre-stored references images that best matches the second image of the one of the pre-owned electronic devices 104 and grade the screen and/or the camera of the one of the pre-owned electronic devices 104 based on how closely the second image of the one of the pre-owned electronic devices 104 matches different ones of the second series pre-stored references images.

Additionally or alternatively, in some embodiments, the control circuitry 114 can parse the second image of the one of the pre-owned electronic devices 104 to identify visual characteristics consistent with the screen and/or the lens of the camera of the one of the pre-owned electronic devices 104 being cracked. Then, the control circuitry 114 can compare the visual characteristics to stored information indicative of screens and/or lens of cameras being cracked to identify whether or to what degree the screen and/or the lens of the camera of the one of the pre-owned electronic devices 104 is cracked and, based thereon, grade the screen and/or the camera of the one of the pre-owned electronic devices 104.

Additionally or alternatively, in some embodiments, the control circuitry 114 can execute a screen grading AI program or algorithm to grade the screen and/or the camera of the one of the pre-owned electronic devices 104. For example, in the training mode, the screen grading AI program or algorithm can be trained to identify the cracks in and corresponding grades of the pre-owned electronic devices, for example, by feeding the screen grading AI program or algorithm with the captured images, the sensor scan data, and/or the identifying information of the known electronic devices with varying grades and different combinations and degrees of the screens and/or the lenses of the cameras being cracked and, responsive thereto, provide the positive and negative feedback for screen and camera grades assigned by the screen grading AI program or algorithm. Based on the positive and negative feedback, the screen grading AI program or algorithm can develop rules and heuristics that can be used to grade the screen and/or the camera of the one of the pre-owned electronic devices 104 when operating outside of the training mode.

Additionally or alternatively, the third station 108 can grade the screen and/or the camera of the one of the pre-owned electronic devices 104 based on an amount of cosmetic wear identified on a front face of the one of the pre-owned electronic devices 104 that is distinct from or short of full ones of the cracks in the screen and/or the lens of the camera of the one of the pre-owned electronic devices 104.

As described above, the fourth station 110 can grade the back and/or the sides of the one of the pre-owned electronic devices 104. In some embodiments, the one of the pre-owned electronic devices 104 can be rotated so that, when the back is facing in one direction, such as downwards, while the one of the pre-owned electronic devices 104 is in the first station 102, the second station 106, and/or the third station 104, the back is rotated to face in a second direction, such as upwards, that is opposite the first direction while the one of the pre-owned electronic devices 104 is in the fourth station 110. As such, in some embodiments, the control circuitry 114 in communication with the fourth station 110 can use the preliminary information associated with the one of the pre-owned electronic devices 104 and the manufacturer, the model, and/or the model ID of the one of the pre-owned electronic devices 104 to grade the back and/or the sides of the one of the pre-owned electronic devices 104. For example, in some embodiments, the control circuitry 114 can use the manufacturer, the model, and/or the model ID of the one of the pre-owned electronic devices 104 to transmit instructions to the fourth station 110 or the positioning elements therein to position an imaging device 122 associated with the fourth station 110 so that the area of the one of the pre-owned electronic devices 104 that the imaging device 122 captures is limited to only that area needed for such grading.

Various embodiments for grading the back and/or the sides of the one of the pre-owned electronic devices 104 are contemplated. For example, in some embodiments, the imaging device 122 can capture a third image of the one of the pre-owned electronic devices 104, and the control circuitry 114 can process the third image of the one of the pre-owned electronic devices 104. In some embodiments, the control circuitry 114 can compare the third image of the one of the pre-owned electronic devices 104 to a third series of pre-stored reference images for which the manufacturer, the model, and/or the model ID matches the manufacturer, the model, and/or the model ID of the one of the pre-owned electronic devices 104, and in these embodiments, each of the third series of pre-stored reference images can include a varying degree of wear or other cosmetic damage. Based on such a comparison, the control circuitry 114 can identify one of the third series of pre-stored references images that best matches the third image of the one of the pre-owned electronic devices 104 and grade the back and/or the sides of the one of the pre-owned electronic devices 104 based on how closely the third image of the one of the pre-owned electronic devices 104 matches different ones of the third series of pre-stored references images. In some embodiments, the imaging device 122, alone or using multiple imaging devices in communication therewith, can capture one image of the back of the one of the pre-owned electronic devices 104 and another image of the sides of the one of the pre-owned electronic devices 104.

Additionally or alternatively, in some embodiments, the control circuitry 114 can parse the third image of the one of the pre-owned electronic devices 104 to identify the visual characteristics consistent with cosmetic damage, such as cracks, dents, and/or scratches. Then, the control circuitry 114 can compare the visual characteristics to the stored information indicative of backs and/or sides of the pre-owned electronic devices with the cosmetic damage to identify whether and to what degree the back and/or the sides of the one of the pre-owned electronic devices 104 includes the cosmetic damage and, based thereon, grade the back and/or the sides of the one of the pre-owned electronic devices 104.

Additionally or alternatively, in some embodiments, the control circuitry 114 can execute a back and side grading AI program or algorithm to grade the cosmetic damage of the back and/or the sides of the one of the pre-owned electronic devices 104. For example, in the training mode, the back and side grading AI program or algorithm can be trained to identify the cosmetic damage in and the corresponding grades of the pre-owned electronic devices, for example, by feeding the back and side grading AI program or algorithm with the captured images, the sensor scan data, and/or the identifying information of the known electronic devices with varying grades and different combinations and degrees of the cosmetic damage and, responsive thereto, provide the positive and negative feedback for back and side grades assigned by the back and side grading AI program or algorithm. Based on the positive and negative feedback, the back and side grading AI program or algorithm can develop rules and heuristics that can be used to grade the back and/or the sides of the one of the pre-owned electronic devices 104 when operating outside of the training mode.

In some embodiments, any images captured by the multi-stage automated assembly line system 100 can be stored for future use in customer disputes. For example, in some embodiments, the control circuitry 114 can save the first image of the one of the pre-owned electronic devices 104 captured in the first station 102 or the second station 104, the second image of the one of the pre-owned electronic devices 104 captured in the third station 108, and/or the third image of the one of the pre-owned electronic devices 104 captured in the fourth station 110 into the database entry generated by the first station 102.

As described above, the sorting station 111 can distribute the one of the pre-owned electronic devices 104 to the one of the plurality of output stations 112 based on the assessments in or from the first station 102, the second station 106, the third station 108, and the fourth station 110. For example, the plurality of output stations 112 can include (1) a first output station for the pre-owned electronic devices in need of polishing or buffering, (2) a second output station for the pre-owned electronic devices in need of repair, (3) a third output station for the pre-owned electronic devices with specific exceptions, (4) a fourth output station for the pre-owned electronic devices that need to be returned, (5) a fifth output station for the pre-owned electronic devices that need to be recycled, and/or (6) other output stations for the pre-owned electronic devices that have been assigned an overall A+, A, B, or C grade.

While the control circuitry 114 is shown in the figures as separate and apart from other elements of the multi-stage automated assembly line system 100 it is to be understood that the control circuitry 118 can be integrated into and/or otherwise communicate with the other elements of the multi-stage automated assembly line system 100 so as to control and/or instruct the other elements of the multi-stage automated assembly line system 100 to execute methods described herein.

In this regard, the first station 102, the second station 106, the third station 108, the fourth station 110, the sorting station 111, and various sub-components thereof can be controlled by a single central processor or multiple processors coupled together. For example, each of the first station 102, the second station 106, the third station 108, the fourth station 110, the sorting station 111, and the various sub-components thereof can include a respective transceiver device and a respective memory device, each of which can be in communication with respective control circuitry, for example, the control circuitry 114, one or more respective programmable processors, and respective executable control software as would be understood by one of ordinary skill in the art. In some embodiments, the respective executable control software of each of the first station 102, the second station 106, the third station 108, the fourth station 110, the sorting station 111, and the various sub-components thereof can be stored on a respective transitory or non-transitory computer readable medium, including, but not limited to local computer memory, RAM, optical storage media, magnetic storage media, flash memory, and the like, and some or all of the respective control circuitry, the respective programmable processors, and the respective executable control software of each of the first station 102, the second station 106, the third station 108, the fourth station 110, the sorting station 111, and the various sub-components thereof can execute and control at least some of the methods described herein.

FIGS. 2-3 are schematic diagrams of another system 200 that can sort and grade the pre-owned electronic devices, such as a user device 202. As seen in FIGS. 2-3, the system 200 can include an inflow system 204, a grading and sorting system 206, control circuitry 208, and a platform 210 that can transport the user device 202 through the system 200.

As also seen in FIG. 2, in some embodiments, the inflow system 204 can include a sensor 212, for example, a photoelectric sensor, an imaging device 214, a first section 216 of the platform 210, a second section 218 of the platform 210, and a third section 220 of the platform 210. In some embodiments, the second section 218 can be located between the first section 216 and the third section 220 such that the sensor 212 can be located at an end of the first section 216 proximate to the second section 218 and such that a gap 222 can be located between the second section 218 and the third section 220 and within a field of view of the imaging device 214. In some embodiments, the gap 222 can be approximately 0.5 inches, and in some embodiments, the first section 216, the second section 218, and the third section 220 can include separate conveyor belts. In some embodiments, the user device 202 can include a data matrix label located on an exterior thereof, and in these embodiments, the imaging device 214 can scan the data matrix label to identify the user device 202 to the control circuitry 208.

As seen in FIG. 3, in some embodiments, the grading and sorting system 206 can include a screen damage detecting system 224, a back defect detecting system 226, a side defect detecting system 228, a screen defect detecting system 230, a positioning device 232, for example, a robotic arm, a first end location 234, a second end location 236, a third end location 238, and a fourth end location 240. In some embodiments, the first end location 234 can be dedicated for user devices having damaged screens, the second end location 236 can be dedicated for user devices having defective backs or defective sides, the third end location 238 can be dedicated for user devices having defective screens, and the fourth end location 240 can be dedicated for undamaged and non-defective user devices. However, in some embodiments, the second end location 236 can be dedicated for user devices having defective backs only, and in these embodiments, the grading and sorting system 206 can also include a fifth end location dedicated for user devices having defective sides.

Figure 4:
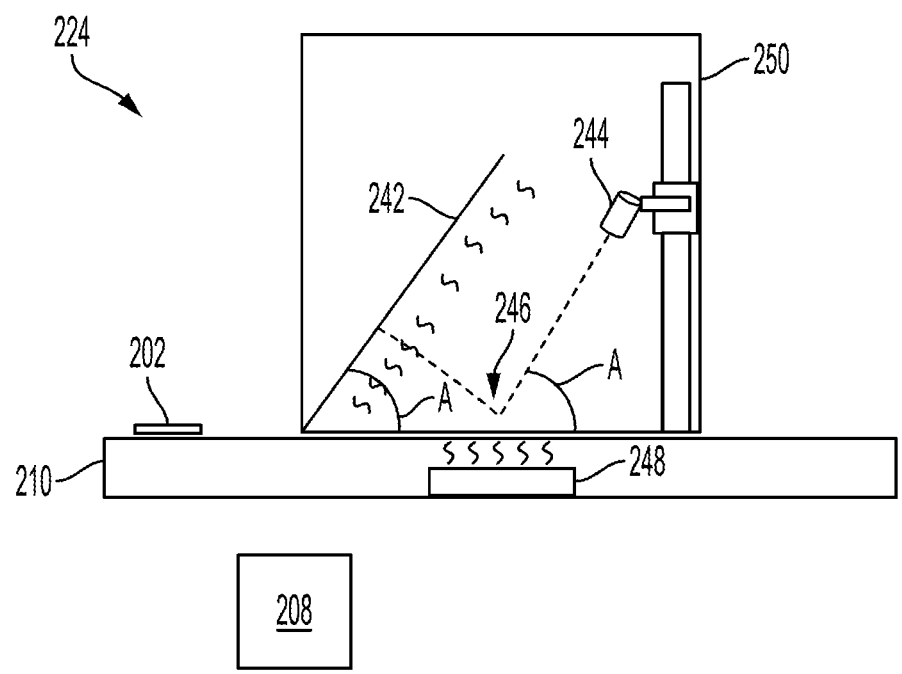
FIG. 4 is a schematic diagram of a screen damage detecting system according to disclosed embodiments.
Figure 5:
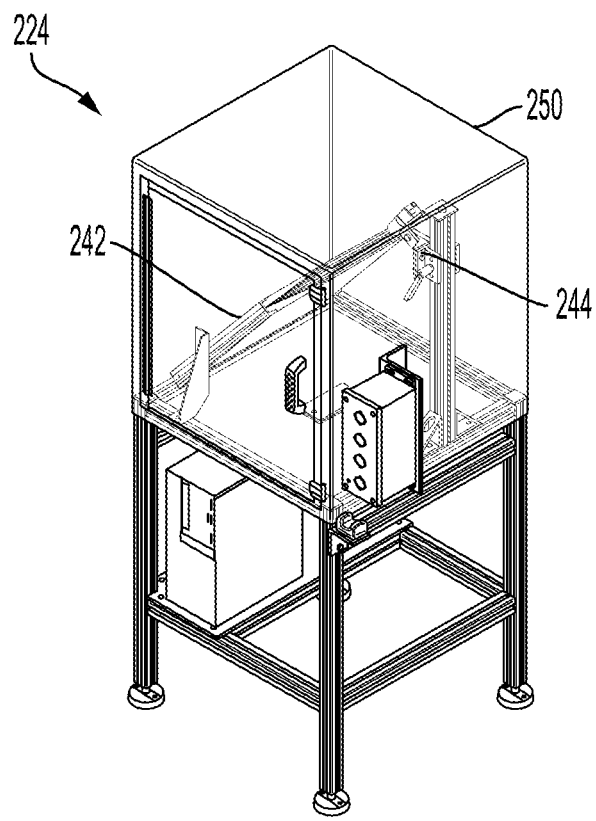
FIG. 5 is a perspective and partially transparent view of a screen damage detecting system according to disclosed embodiments.
Figure 6:
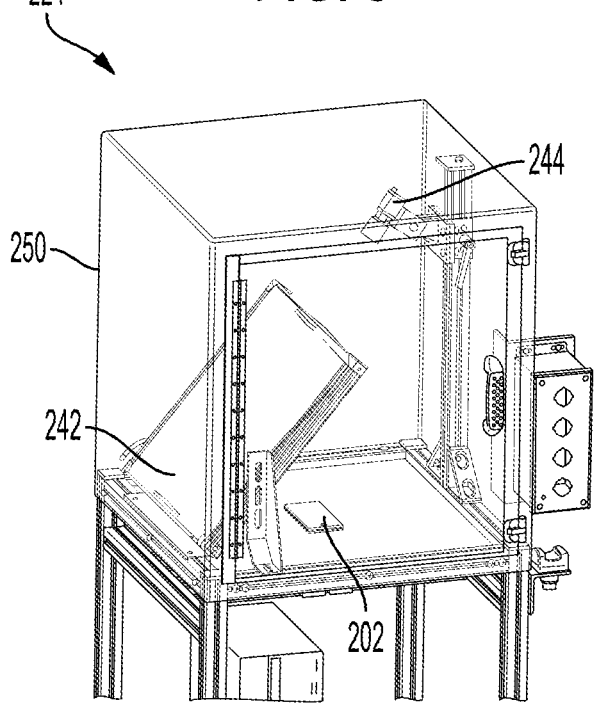
FIG. 6 is a perspective and partially transparent view of a screen damage detecting system according to disclosed embodiments.
Figure 7:
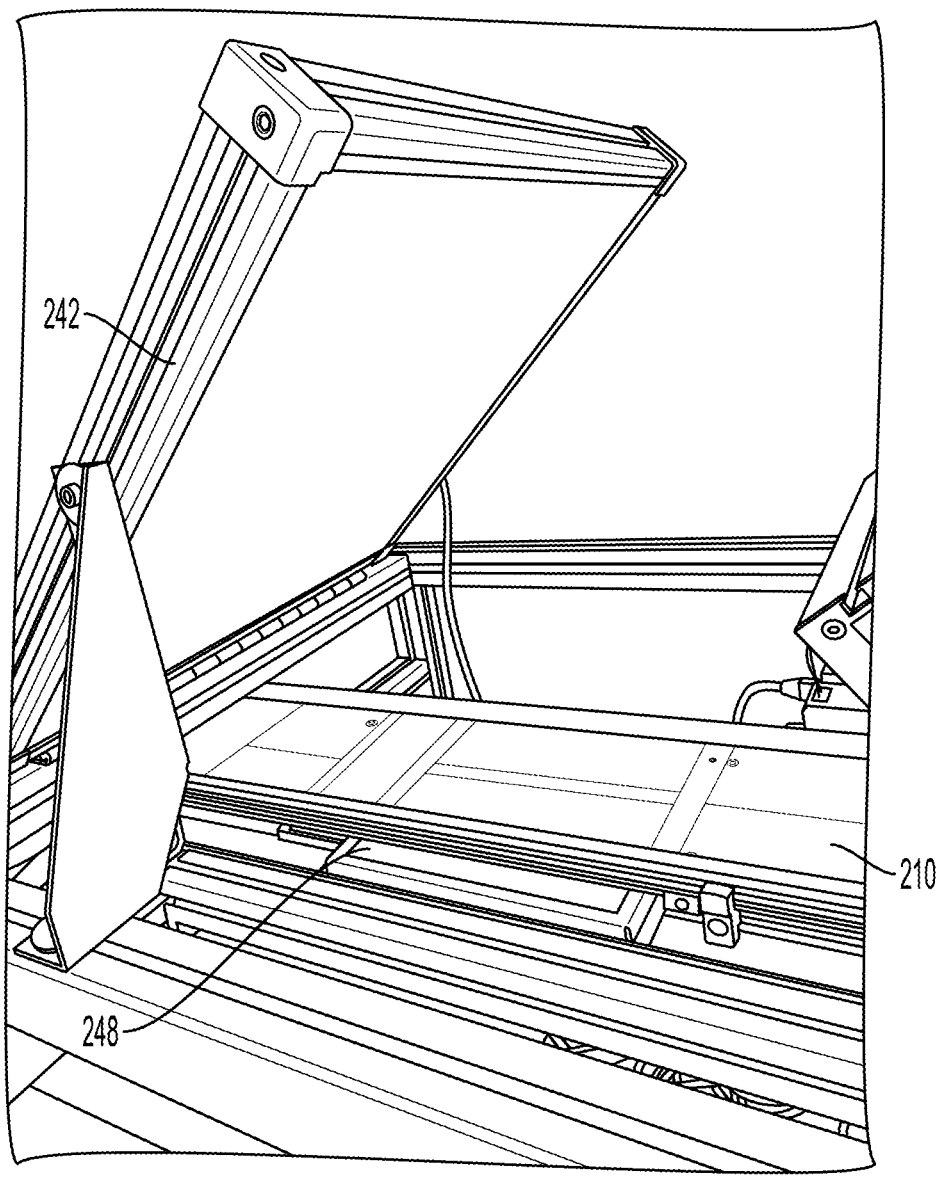
FIG. 7 is a view of an over conveyor belt light in a screen damage detecting system according to disclosed embodiments.
Figure 8:
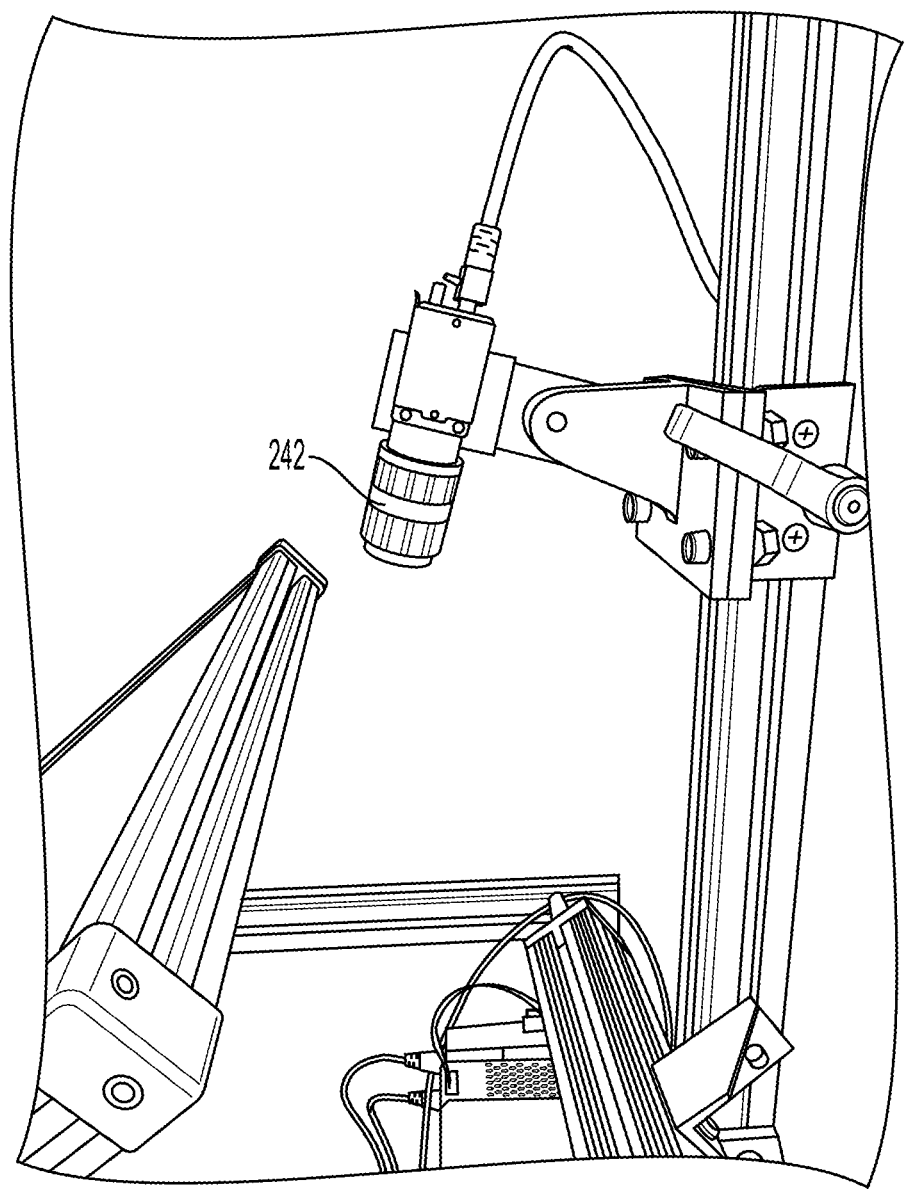
FIG. 8 is a view of an image capturing device in a screen damage detecting system according to disclosed embodiments.
Figure 9:
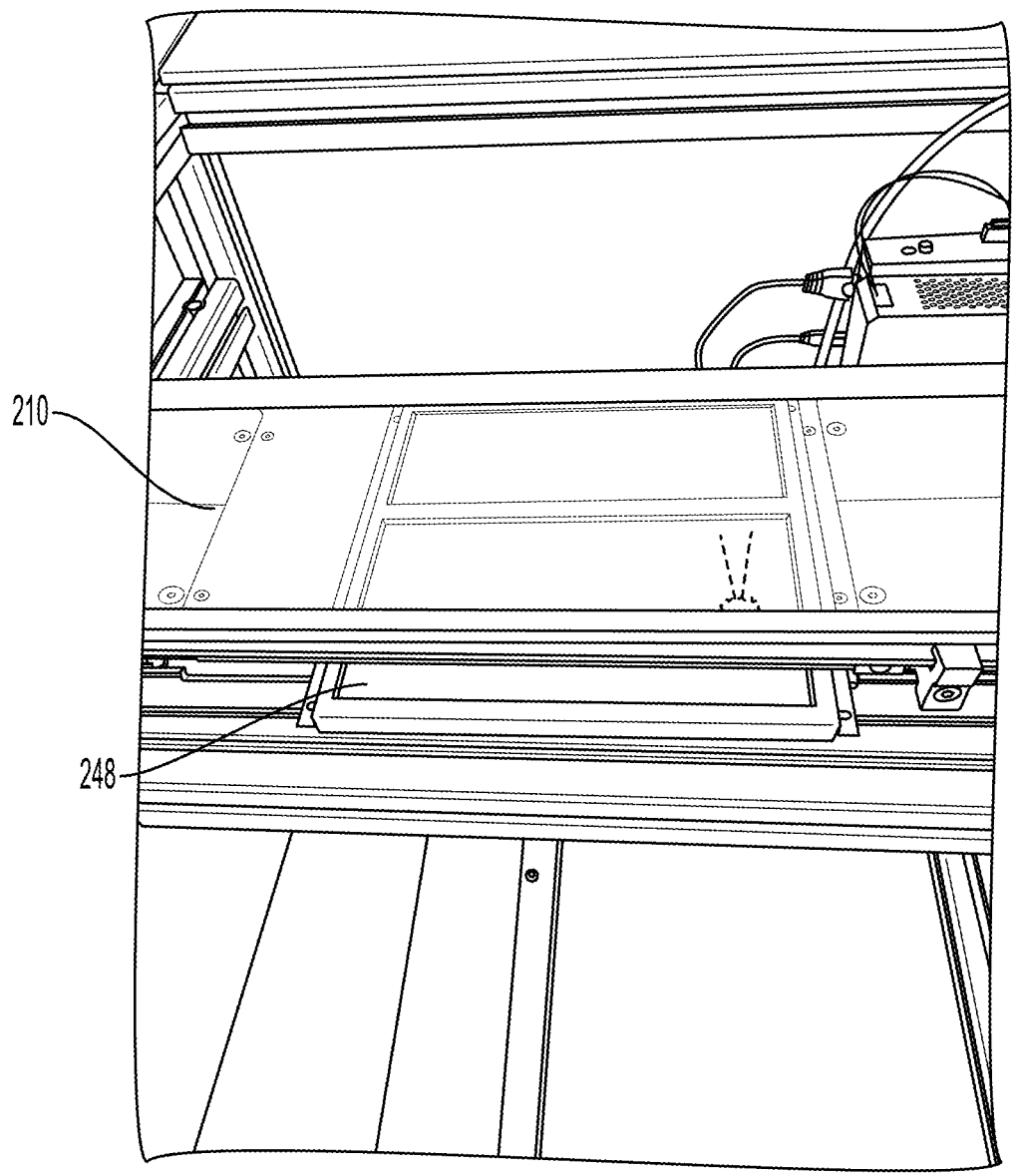
FIG. 9 is a view of an under conveyor belt light in a screen damage detecting system according to disclosed embodiments.
Figure 10:
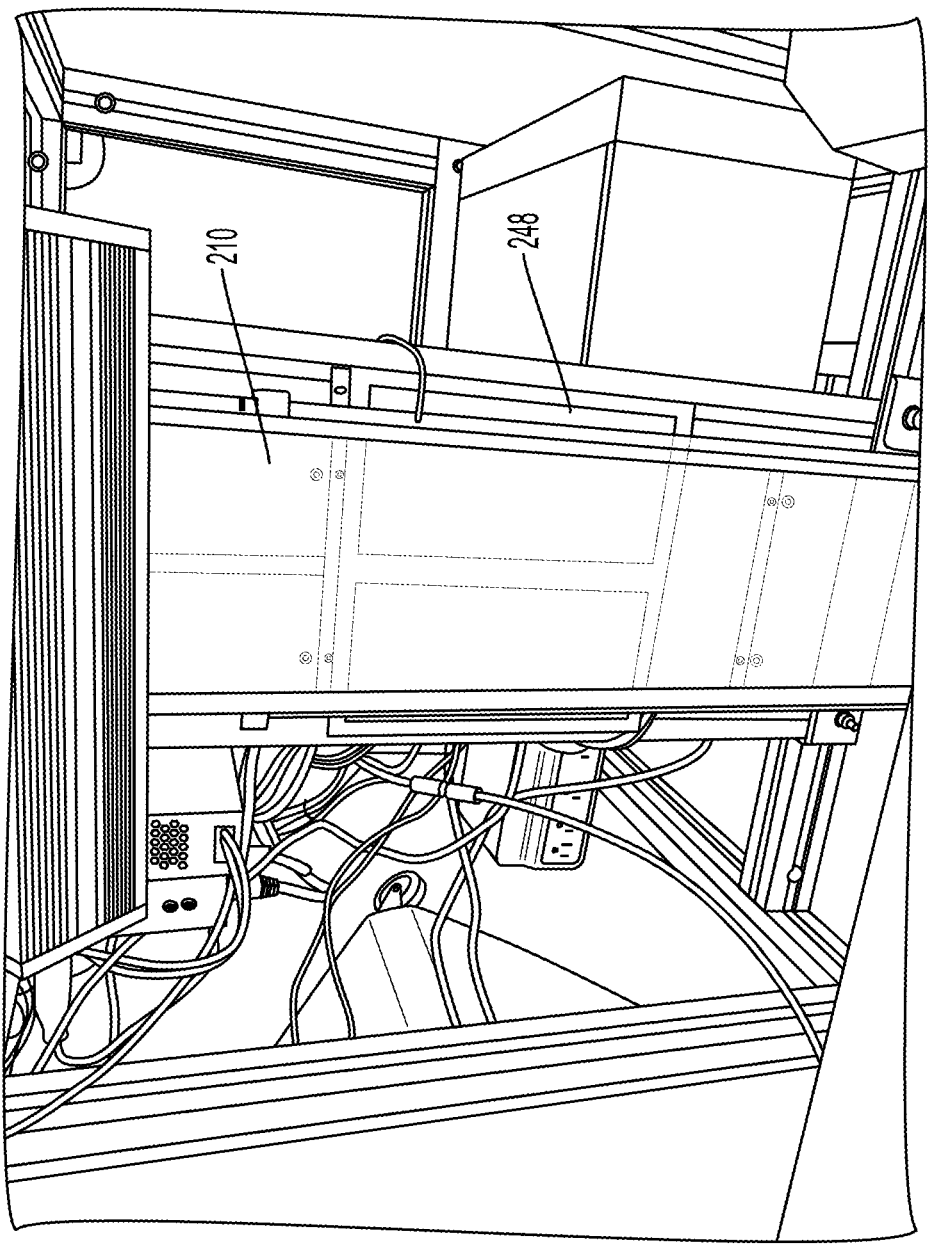
FIG. 10 is a view of an under conveyor belt light in a screen damage detecting system according to disclosed embodiments.
Figure 11:
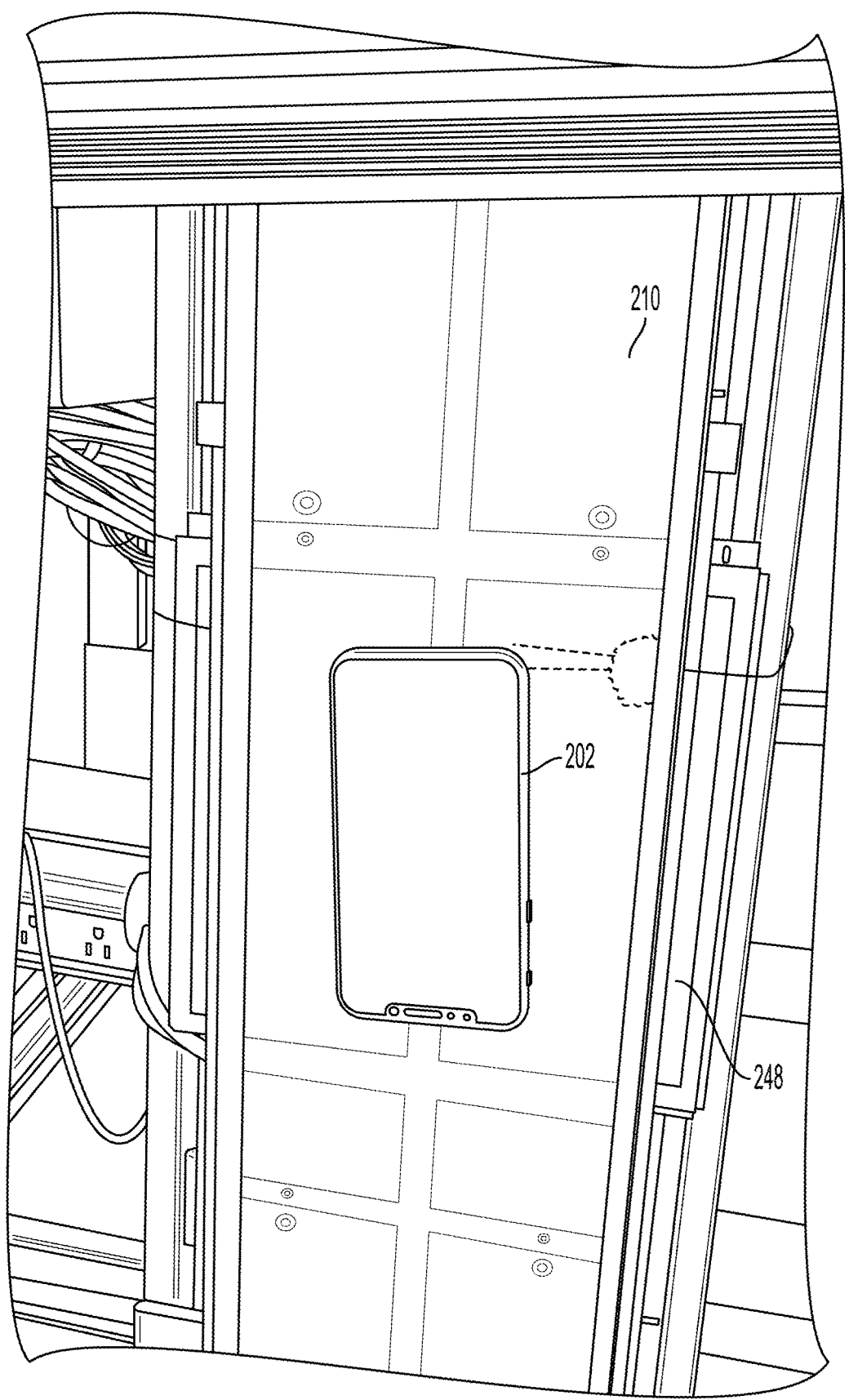
FIG. 11 is a view of a user device on a conveyor belt and located above an under conveyor belt light in a screen damage detecting system according to disclosed embodiments.

FIG. 4 is a schematic diagram of the screen damage detecting system 224 according to disclosed embodiments, and FIGS. 5-12 are other views of the screen damage detecting system 224 according to disclosed embodiments. As seen in FIGS. 4-8, in some embodiments, the screen damage detecting system 224 can include a lighting element 242 for example, an ELF infrared (IR) light, and an imaging device 244, both of which can be located within a housing 250. In some embodiments, an orientation of the lighting element 242 can be positioned relative to the platform 210, for example, above the platform 210, at an angle A, and an orientation of the imaging device 244 can be positioned relative to the platform, for example, above the platform 210, at the angle A such that light emitted from the lighting element 242 and a field of view of the imaging device 244 can form a right angle 246 where the light emitted from the lighting element 242 and the field of view of the imaging device 244 meet at the user device 202 when the user device 202 is located at a predetermined location within the screen damage detecting system 224.

As seen in FIGS. 4, 7, and 9-11, in some embodiments, the screen damage detecting system 224 can also include a lighting element 248, for example, a spectrum IR light, that can be located outside of the housing 250. In particular, in some embodiments, the lighting element 248 can be located under the platform 210, and in these embodiments, a portion of the platform 210 can be at least partially transparent to enable light emitted from the lighting element 248 to pass through the platform 210 and illuminate the user device 202 from underneath the platform 210.

Figure 12:
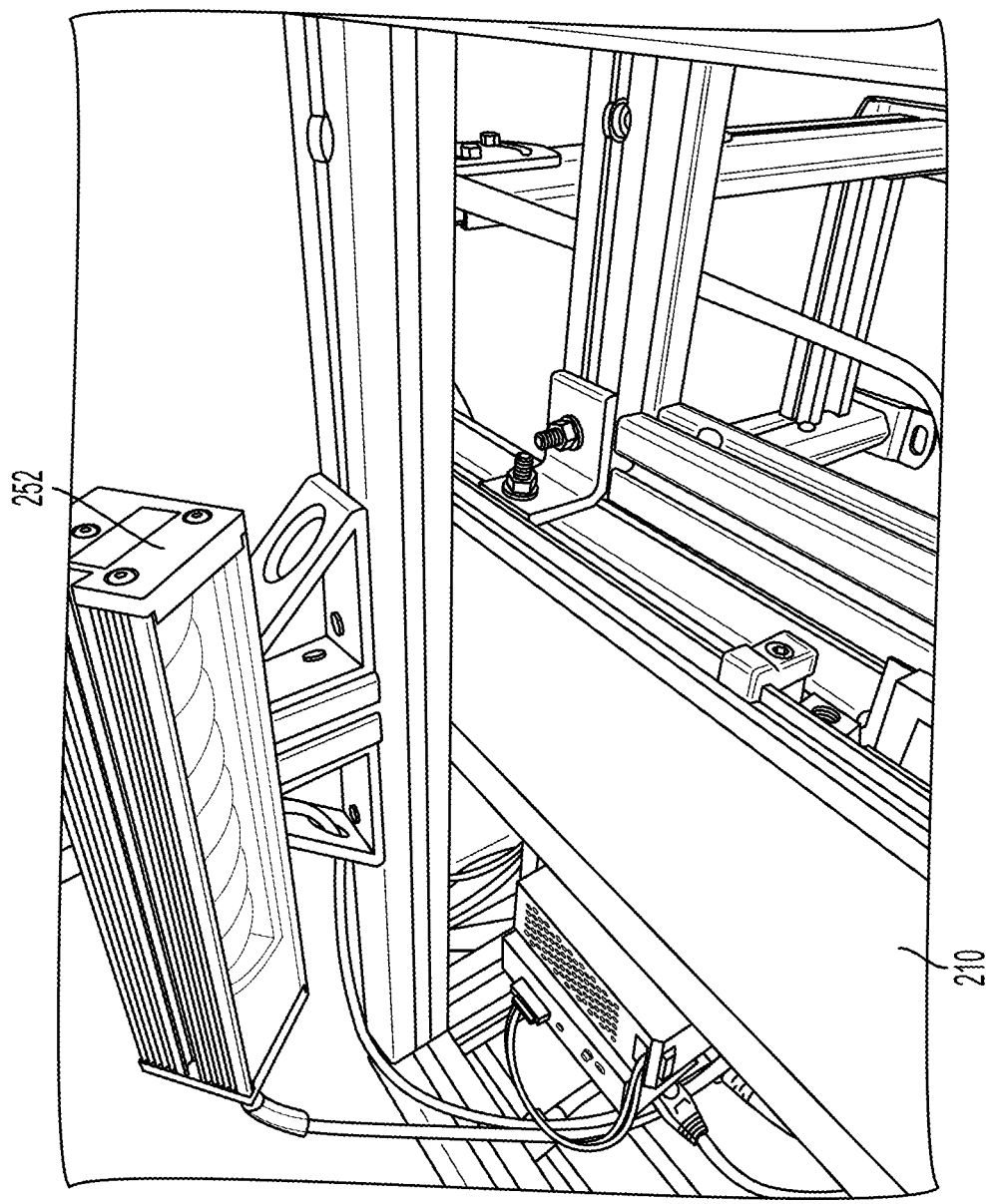
FIG. 12 is a view of an over conveyor belt light in a screen damage detecting system according to disclosed embodiments.

As seen in FIG. 12, in some embodiments, the screen damage detecting system 224 can also include a lighting element 252, for example, an ELF LED light, located within the housing 250 and opposite the first lighting element 242. In some embodiments, the third lighting element 252 can be vertically closer to the platform 210 than the lighting element 242.

Figure 13:
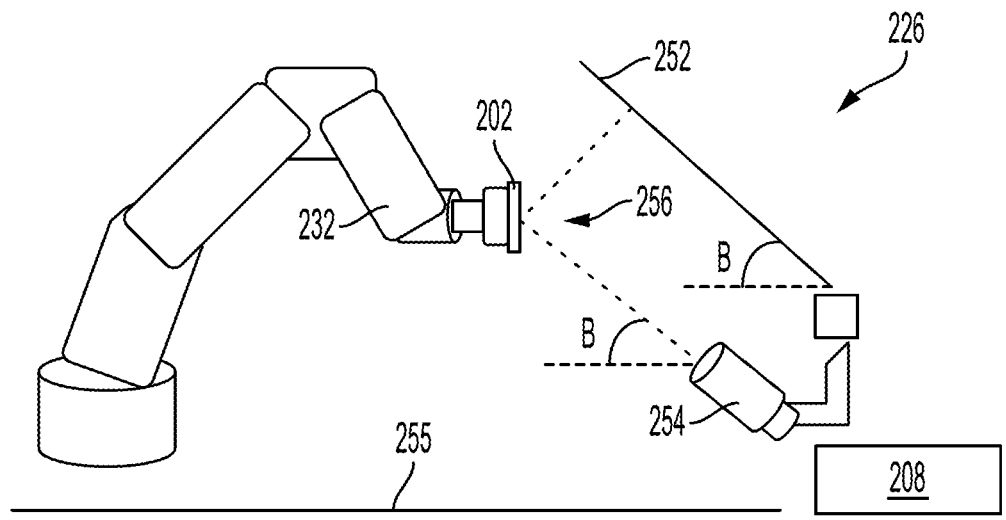
FIG. 13 is a schematic diagram of a back defect detecting system according to disclosed embodiments.

FIG. 13 is a schematic diagram of the back defect detecting system 226 according to disclosed embodiments. As seen in FIG. 13, the back defect detecting system 226 can include the positioning device 232 for positioning and orienting the user device 202 within the back defect detecting system 226, a lighting element 252, and an imaging device 254, for example, a line scanning camera. For example, the lighting element 252 can be positioned relative to a ground 255 or some other surface, such as one parallel to the ground 225, at an angle B, and the imaging device 254 can be positioned relative to the ground 255 or the other surface at the angle B such that light emitted from the lighting element 252 and a field of view of the imaging device 254 can form a right angle 256 where the light emitted from the lighting element 252 and the field of view of the imaging device 254 meet at the user device 202 when the user device 202 is located at a predetermined location and in a predetermined orientation within the back defect detecting system 226. In some embodiments, the predetermined orientation can include the back of the user device 202 facing the imaging device 254.

Figure 14:
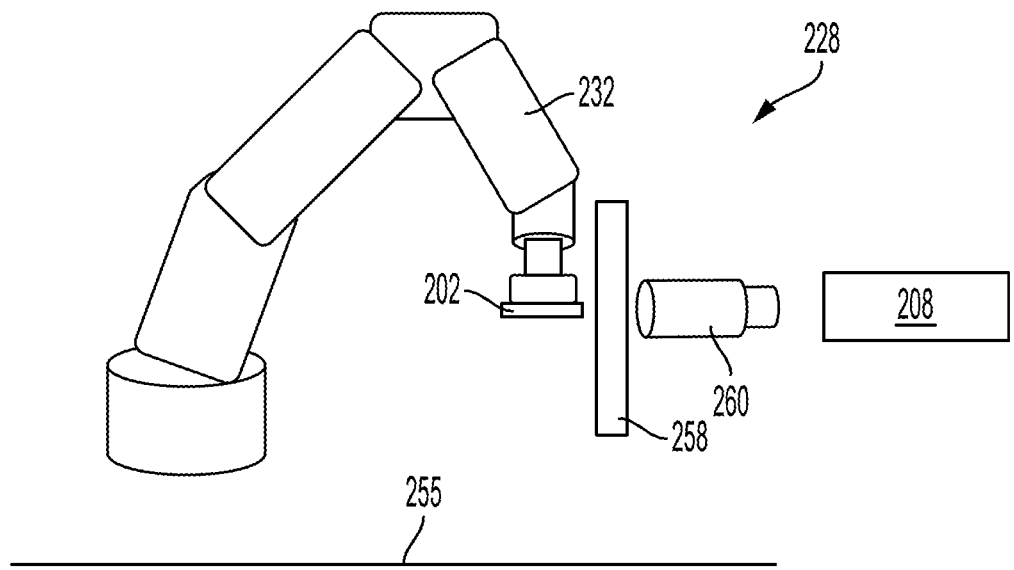
FIG. 14 is a schematic diagram of a side defect detecting system according to disclosed embodiments.

FIG. 14 is a schematic diagram of the side defect detecting system 228 according to disclosed embodiments. As seen in FIG. 14, the side defect detecting system 228 can include a lighting element 258, for example, an inline controller see-through bar light, and an imaging device 260, for example, a line scanning camera, that can be placed on one side of the lighting element 258 opposite a side of the lighting element 258 proximate to the user device 202. In some embodiments, the imaging device 260 can include a telecentric lens, and in these embodiments, the imaging device can be moved closer to and away from the lighting element 258 for capturing images of the user device 202.

Figure 15:
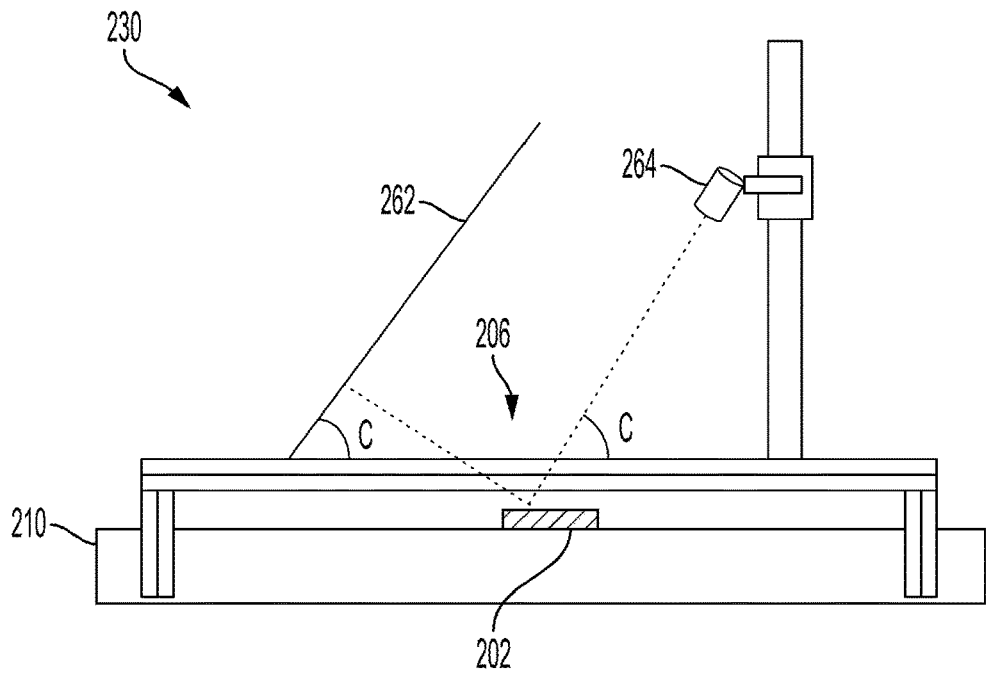
FIG. 15 is a schematic diagram of a screen defect detecting system according to disclosed embodiments.
Figure 16:
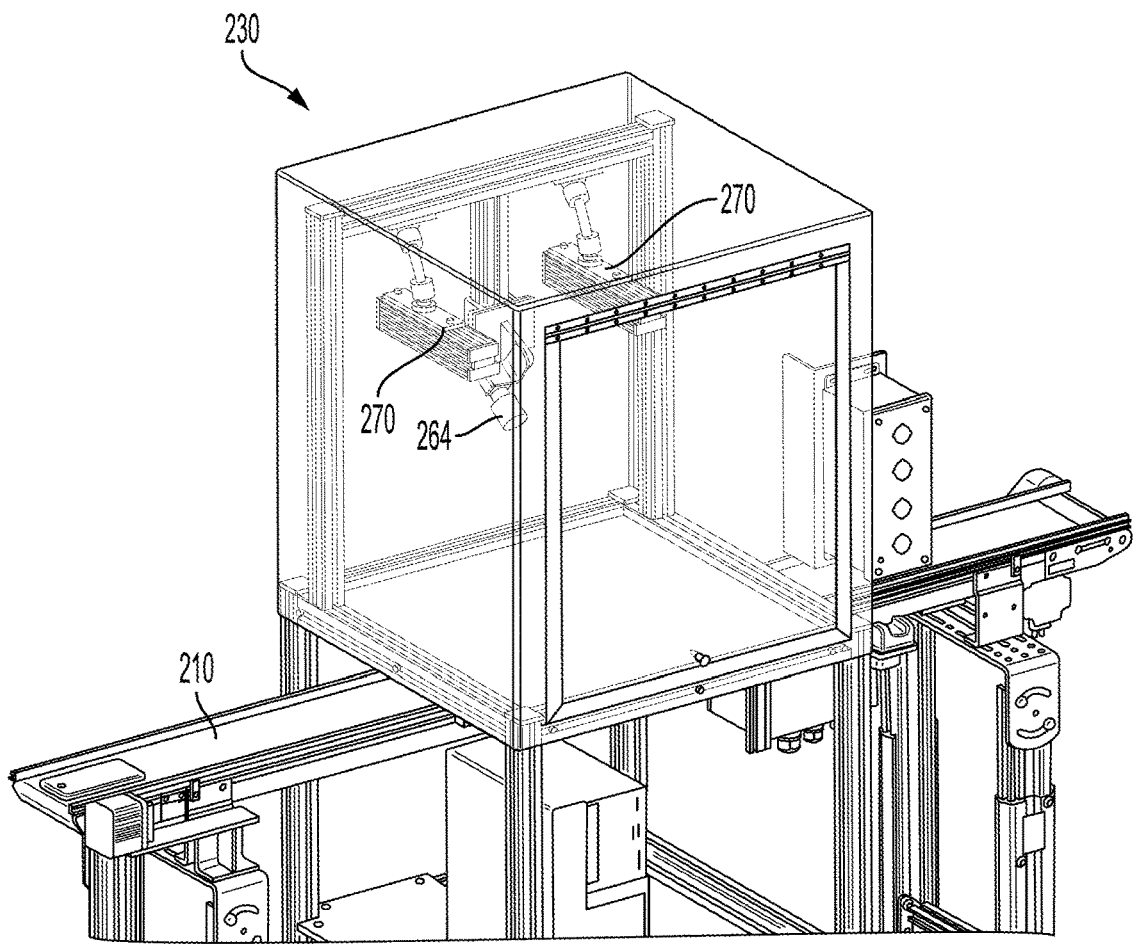
FIG. 16 is a perspective and partially transparent view of a screen defect detecting system according to disclosed embodiments.

FIG. 15 is a schematic diagram of the screen defect detecting system 230 according to disclosed embodiments, and FIG. 16 is another view of the screen defect detecting system 230 according to disclosed embodiments. As seen in FIG. 15, in some embodiments, the screen defect detecting station 230 can include a lighting element 262, for example, an ELF LED light, that can be positioned relative to the platform 210 at an angle C and an imaging device 264, for example, a line scanning camera, that can be positioned relative to platform 210 at the angle C such that light emitted from the lighting element 262 and a field of view of the imaging device 264 can form a right angle 266 where the light emitted from the lighting element and the field of view of the imaging device 264 meet at the user device 202 when the user device 202 is located at a predetermined location within the screen defect detecting system 230. Additionally or alternatively, as seen in FIG. 16, in some embodiments, the screen defect detecting system 230 can include lighting elements 270 that can be oriented parallel to the platform 210 so that light emitted from the lighting elements 270 is perpendicular to the platform 210.

While the control circuitry 208 is shown in the figures as separate and apart from other elements of the system 200, it is to be understood that the control circuitry 208 can be integrated into and/or otherwise communicate with the other elements of the system 200 so as to control and/or instruct the other elements of the system 200 to execute methods described herein.

In this regard, the inflow system 204, the grading and sorting system 206, the platform 210, and various sub-components thereof can be controlled by a single central processor or multiple processor coupled together. For example, each of the inflow system 204, the grading and sorting system 206, the platform 210, and the various sub-components thereof can include a respective transceiver device and a respective memory device, each of which can be in communication with respective control circuitry, for example, the control circuitry 208, one or more respective programmable processors, and respective executable control software as would be understood by one of ordinary skill in the art. In some embodiments, the respective executable control software of each of the inflow system 204, the grading and sorting system 206, the platform 210, and the various sub-components thereof can be stored on a respective transitory or non-transitory computer readable medium, including, but not limited to local computer memory, RAM, optical storage media, magnetic storage media, flash memory, and the like, and some or all of the respective control circuitry, the respective programmable processors, and the respective executable control software of each of the inflow system 204, the grading and sorting system 206, the platform 210, and the various sub-components thereof can execute and control at least some of the methods described herein.

Figure 17:
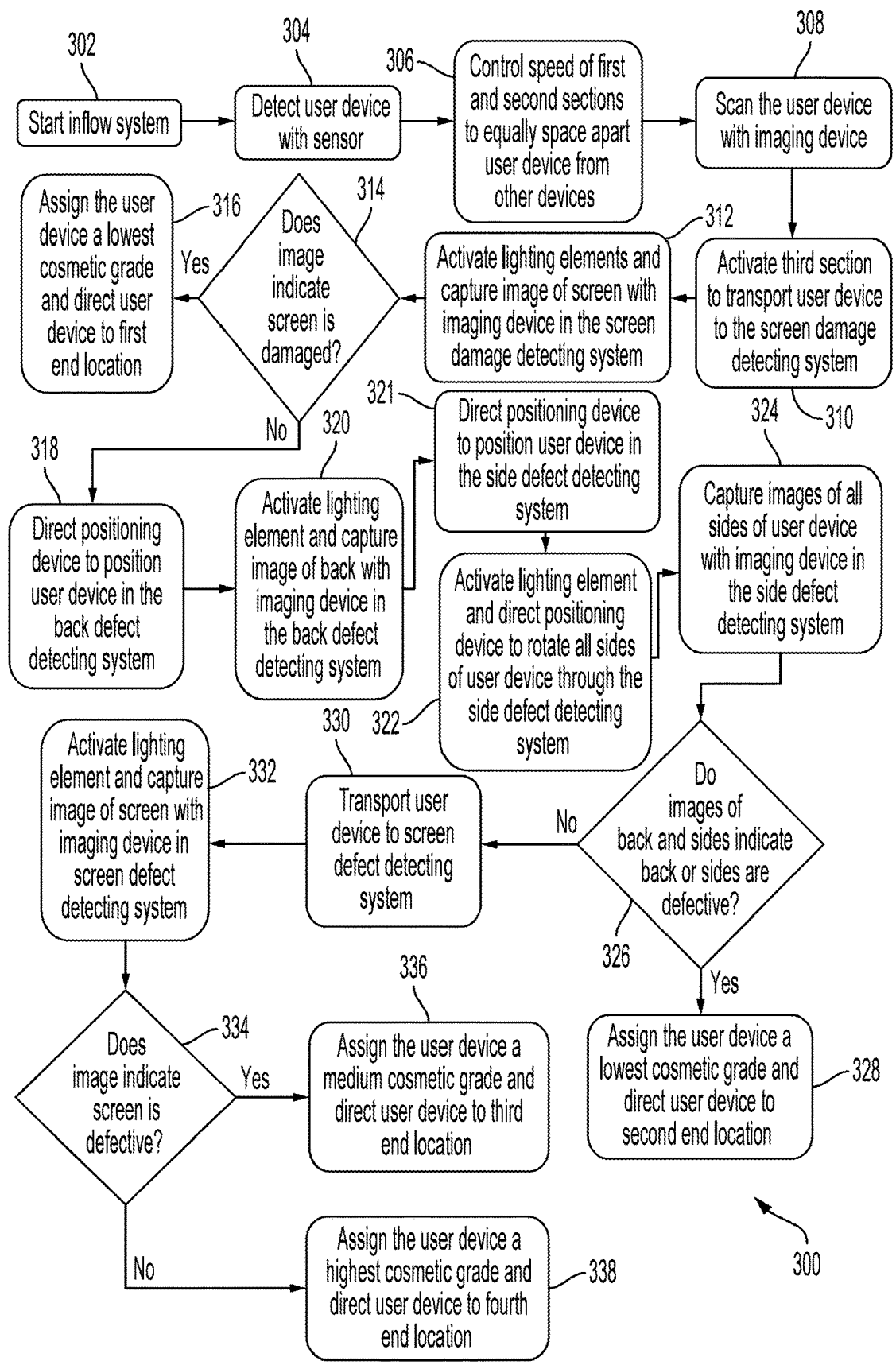
FIG. 17 is a flow diagram of a method according to disclosed embodiments.

FIG. 17 is a flow diagram of a method 300 according to disclosed embodiments. As seen in FIG. 17, the method 300 can include the control circuitry 208 starting the inflow system 204, as in 302, detecting the user device 202 with the sensor 212, as in 304, and controlling a speed of the first section 216 and the second section 218 to equally space the user device 202 relative to other user devices in the system 200, as in 306.

Then, the method 300 can include the control circuitry 208 scanning the user device 202 with the imaging device 214 to identify the user device 202 to the control circuitry 208, as in 308. In some embodiments, identifying the user device 202 to the control circuitry 208 can include the control circuitry 208 receiving any information identifying a make and a model of the user device 202 and the control circuitry 208 generating a database entry for the user device 202 into which a cosmetic grade for the user device 202 can be saved.

After scanning the user device 202, the method 300 can include the control circuitry 208 activating the third section 220 to transport the user device 202 to the screen damage detecting system 224, as in 310. Then, the method 300 can include the control circuitry 208 (1) activating the lighting element 242 and the lighting element 248 simultaneously with the lighting element 242 and (2) instructing the imaging device 244 to capture a first image of the screen of the user device 202 while the user device 202 is at the predetermined location within the screen damage detecting system 224 and is being illuminated by the lighting element 242 and the lighting element 248, as in 312.

After capturing the first image of the screen of the user device 202, the method 300 can include the control circuitry 208 parsing the first image of the screen of the user device 202 to determine whether the screen of the user device 202 is damaged, as in 314. For example, in some embodiments, the control circuitry 208 can determine that the screen of the user device 202 is damaged when the control circuitry 202 identifies at least a predetermined number of cracks on the screen of the user device 202 depicted in the first image of the user device 202. When the control circuitry 208 determines that the screen of the user device 202 is damaged, the method 300 can include the control circuitry 208 assigning the user device 202 a lowest cosmetic grade and directing the platform 210 to maneuver the user device 202 to the first end location 234, as in 316. For example, in some embodiments, the control circuitry 208 can direct a first pushing device to push the user device 202 onto a conveyor belt associated with the first end location 234 after the user device 202 leaves the screen damage detecting system 224.

However, when the control circuitry 208 fails to determine that the screen of the user device is damaged, the method 300 can include the control circuitry 208 directing the positioning device 232 to position the user device 202 within the back defect detecting system 226 with the predetermined orientation, as in 318. Then, the method 300 can include the control circuitry 208 activating the lighting element 252 and instructing the imaging device 254 to capture an image of the back of the user device 202 while the user device 202 is at the predetermined location within the back defect detecting system 226 and is being illuminated by the lighting element 252, as in 320. In some embodiments, the method 300 can include the control circuitry 208 directing the positioning device 232 to maneuver a center of the user device 202 toward or away from an apex of the right angle 256 to ensure optimal image clarity during acquisition of the image of the back of the user device 202.

Before or after the user device 202 is in the back defect detecting system 226, the method 300 can include the control circuitry 208 (1) directing the positioning device 232 to position the user device 202 within the side defect detecting system 228, as in 321, (2) activating the lighting element 258, and (3) directing the positioning device 252 to rotate all sides of the user device 202 through the field of view of the imaging device 260 and light emitted by the lighting element 258 within the side defect detecting system 228, as in 322. During such rotation, the method 300 can include the control circuitry 208 instructing the imaging device 260 to capture the images of the sides of the user device 202 while the user device 202 is being illuminated by the lighting element 258, as in 324.

Immediately or some other time after capturing the image of the back of the user device 202 and the images of the sides of the user device 202, the method 300 can include the control circuitry 208 parsing the image of the back of the user device 202 and the images of the sides of the user device 202 to determine whether the back of the user device 202 and/or any sides of the user device 202 are defective, as in 326. For example, in some embodiments, the control circuitry 208 can determine that the back of the user device 202 or the sides of the user device 202 are defective when the control circuitry 202 identifies at least a predetermined amount cracks or scratches on the back of the user device 202 depicted in the image of the back of the user device or the sides of the user device 202 depicted in the images of the sides of the user device. When the control circuitry 208 determines that the back of the user device 202 or any sides of the user device 202 are defective, the method 300 can include the control circuitry assigning the user device 202 a lowest cosmetic grade and directing the platform to maneuver the user device 202 to the second end location 236 and/or the fifth end location, as in 328. For example, in some embodiments, the control circuitry 208 can direct a second pushing device to push the user device 202 onto a conveyor belt associated with the second end location 236 and/or the fifth end location after the user device 202 leaves the back defect detecting system 226 and the side defect detecting system 228.

However, when the control circuitry 208 fails to determine that the back of the user device 202 or any sides of the user device 202 are defective, the method 300 can include the control circuitry 208 directing the platform 210 to transport the user device 202 to the screen defect detecting system 230, as in 330.

After transporting the user device 202 to the screen defect detecting system 230, the method 300 can include the control circuitry 208 activating the lighting element 262 and instructing the imaging device 264 to capture a second image of the screen of the user device 202 while the user device 202 is at the predetermined location within the screen defect detecting system 230 and is being illuminated by the lighting element 264, as in 332. Then, the method 300 can include the control circuitry 300 parsing the second image of the screen of the user device 202 to determine whether the screen of the user device 202 is defective, as in 334. For example, in some embodiments, the control circuitry 208 can determine that the screen of the user device 202 is defective when the control circuitry 202 identifies at least a predetermined number of scratches on the screen of the user device 202 depicted in either the first of the user device 202 or the second image of the user device 202. When the control circuitry 208 determines that the screen of the user device 202 is defective, the method 300 can include the control circuitry 208 assigning the user device 202 a medium cosmetic grade and directing the platform 210 to maneuver the user device 202 to the third end location 238, as in 336. For example, in some embodiments, the control circuitry 208 can direct a third pushing device to push the user device 202 onto a conveyor belt associated with the third end location 238 after the user device 202 leaves the screen defect detecting system 230. However, when the control circuitry 208 fails to determine that the screen of the user device 202 is defective, the method 300 can include the control circuitry assigning the user device 202 a highest cosmetic grade and directing the platform 210 to maneuver the user device 202 to the fourth end location 240, as in 338.

In some embodiments, the grading and sorting system 206 need not include the screen defect detecting station 230, and in these embodiments, when the control circuitry 202 fails to determine that the screen of the user device 202 is damaged, the method 300 can include the control circuitry 208 parsing the first image of the screen of the user device 202 again to determine whether the screen is defective.

In some embodiments, prior to instructing the imaging device 244, the imaging device 254, the imaging device 260, and/or the imaging device 264 to capture the above-identified images, the method 300 can also include the control circuitry 208 instructing some or all of those imaging device to adjust various parameters thereof for obtaining a highest quality image possible. For example, in some embodiments, the various parameters can include line acquisition rate, exposure, brightness, and contrast, and the control circuitry 208 can identify optimal values for those parameters based on a color of the user device 202 and a speed that the user device 202 is being moved relative to a respective one of the imaging devices 244, 254, 260, and 264. In these embodiments, the system 200 can include an encoder that can identify the speed of the user device 202 with positional data transmitted to the control circuitry 208 and a device color sensor that can identify the color of the user device 202 with RGB value data transmitted to the control circuitry 208.

While the multi-stage automated assembly line system 100 and the system 200 are shown in separate figures and described as separate embodiments, it is to be understood that any and all stations, systems, devices, or other components of the multi-stage automated assembly line system 100 can be used in connection with the system 200 and that any and all stations, systems, devices, or other components of the system 200 can be used in connection with the multi-stage automated assembly line system 100. As such, it is to be understood that the multi-stage automated assembly line system 100 can execute some or all of the method 300. For example, as a specific, but non-limiting example, the first station 102 and the second station 106 of the multi-stage automated assembly line system 100 can identify the user device 202, as in 308. As another specific, but non-limiting example, the third station 108 of the multi-stage automated assembly line system 100 can determine whether the screen of the user device 202 is damaged or defective, as in 314 and 334, and the fourth station 110 of the multi-stage automated assembly line system 100 can determine whether the back of the user device 202 or the sides of the user device 202 are defective, as in 326.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
a first lighting element positioned at an angle relative to a platform;
an imaging device positioned at the angle relative to the platform such that light emitted from the first lighting element and a field of view of the imaging device form a right angle where the light emitted from the first lighting element and the field of view meet at a user device when the user device is positioned at a predetermined location on the platform; and
control circuitry that activates the first lighting element, instructs the imaging device to capture an image of a screen of the user device while the user device is at the predetermined location and is being illuminated by the first lighting element, and parses the image to determine whether the screen is damaged.

2. The system of claim 1 further comprising:
a second lighting element,
wherein the first lighting element is positioned above the platform,
wherein the second lighting element is positioned below the platform, and
wherein the control circuitry activates the second lighting element simultaneously with the first lighting element and instructs the imaging device to capture the image while the user device is at the predetermined location and is being illuminated by the first lighting element and the second lighting element.

3. The system of claim 1 wherein, when the control circuitry determines that the screen is damaged, the control circuitry assigns the user device a low cosmetic grade and directs the platform to maneuver the user device to a first end location dedicated for user devices having damaged screens.

4. The system of claim 3 wherein, when the control circuitry fails to determine that the screen is damaged, the control circuitry parses the image to determine whether the screen is defective, wherein, when the control circuitry determines that the screen is defective, the control circuitry assigns the user device a medium level cosmetic grade and directs the platform to maneuver the user device to a second end location dedicated for user devices having defective screens, and wherein, when the control circuitry fails to determine that the screen is defective, the control circuitry assigns the user device a high level cosmetic grade and directs the platform to maneuver the user device to a third end location dedicated for undamaged and non-defective user devices.

5. The system of claim 4 wherein the control circuitry determines that the screen is damaged when the control circuitry identifies at least a predetermined number of cracks on the screen depicted in the image, and wherein the control circuitry determines that the screen is defective when the control circuitry identifies at least a predetermined amount of scratches on the screen depicted in the image.

6. The system of claim 4 further comprising:
a housing that encloses the first lighting element and the imaging device,
wherein the platform includes a conveyor belt that maneuvers the user device to the predetermined location within the housing and to the first end location, the second end location, or the third end location after the imaging device captures the image.

7. The system of claim 1 wherein, when the control circuitry determines that the screen is damaged, the control circuitry assigns the user device a cosmetic grade associated with user devices having damaged screens and directs the platform to maneuver the user device to a first end location dedicated for user devices having damaged screens.

8. The system of claim 1, wherein the first lighting element is a planar light defining a two-dimensional illumination.

9. The system of claim 1, wherein the first lighting element defines a plane perpendicular to a center angle of the light emitted from the first lighting element, wherein the plane and the imaging device are oriented parallel to each other.

10. A system comprising:
a positioning device;
a first lighting element positioned at a first angle relative to ground;
a first imaging device positioned at the first angle relative to the ground such that light emitted from the first lighting element and a first field of view of the first imaging device form a right angle where the light emitted from the first lighting element and the first field of view meet at a back of a user device when the user device is positioned at a first predetermined location and the back of the user device is positioned in a predetermined orientation by the positioning device; and
control circuitry that activates the first lighting element, instructs the first imaging device to capture a first image of the back of the user device while the user device is at the first predetermined location and the back of the user device is being illuminated by the first lighting element, and parses the first image to determine whether the back of the user device is defective.

11. The system of claim 10 further comprising:
a second lighting element; and
a second imaging device,
wherein the control circuitry activates the second lighting element, activates the positioning device to rotate all sides of the user device through a second field of view of the second imaging device and light emitted from the second lighting element, and instructs the second imaging device to capture second images of the sides of the user device while the user device is being illuminated by the second lighting element,
wherein the control circuitry parses the second images to determine whether any sides of the user device are defective, and
wherein, when the control circuitry determines that the back of the user device or any sides of the user device are defective, the control circuitry assigns the user device a low cosmetic grade and directs a platform to maneuver the user device to a first end location dedicated for user devices having defective backs or defective sides.

12. The system of claim 11 wherein the control circuitry determines that the back of the user device or any sides of the user device are defective when the control circuitry identifies at least a predetermined amount of cracks or scratches on the back of the user device depicted in the first image or the sides of the user device depicted in the second images.

13. The system of claim 11 further comprising:
a third lighting element positioned at a second angle relative to the platform; and
a third imaging device positioned at the second angle relative to the platform such that light emitted from the third lighting element and a third field of view of the third imaging device form a right angle where the light emitted from the third lighting element and the third field of view meet at the user device when the user device is positioned at a second predetermined location on the platform,
wherein, when the control circuitry fails to determine that the back of the user device or any sides of the user device are defective, the control circuitry directs the platform to maneuver the user device to the second predetermined location, activates the third lighting element, and instructs the third imaging device to capture a third image of the user device while the user device is at the second predetermined location and is being illuminated by the third lighting element,
wherein the control circuitry parses the third image to determine whether the screen is defective,
wherein, when the control circuitry determines that the screen is defective, the control circuitry assigns the user device a medium cosmetic grade and directs the platform to maneuver the user device to a second end location dedicated for user devices having defective screens, and
wherein, when the control circuitry fails to determine that the screen is defective, the control circuitry assigns the user device a high cosmetic grade and directs the platform to maneuver the user device to a third end location dedicated for undamaged and non-defective user devices.

14. The system of claim 13 wherein the control circuitry determines that the screen is defective when the control circuitry identifies at least a predetermined number of scratches on the screen depicted in the third image.

15. A method comprising:
positioning a first lighting element and a first imaging device at a first angle relative to a platform such that light emitted from the first lighting element and a first field of view of the first imaging device form a right angle where the light emitted from the first lighting element and the first field of view meet at a user device when the user device is positioned at a first predetermined location on the platform;
activating the first lighting element;
instructing the first imaging device to capture a first image of a screen of the user device while the user device is at the first predetermined location and is being illuminated by the first lighting element;

parsing the first image with control circuitry to determine whether the screen is damaged; and when the control circuitry determines that the screen is damaged, assigning the user device a low cosmetic grade and directing the platform to maneuver the user device to a first end location dedicated for user devices having damaged screens.

16. The method of claim 15 further comprising:

activating a second lighting element simultaneously with the first lighting element, wherein the first lighting element is positioned above the platform, and wherein the second lighting element is positioned below the platform; and instructing the first imaging device to capture the first image while the user device is at the first predetermined location and is being illuminated by the first lighting element and the second lighting element.

17. The method of claim 15 further comprising:

when the control circuitry fails to determine that the screen is damaged, parsing the first image to determine whether the screen is defective;

when the control circuitry determines that the screen is defective, assigning the user device a medium cosmetic grade and directing the platform to maneuver the user device to a second end location dedicated for user devices having defective screens; and when the control circuitry fails to determine that the screen is defective, assigning the user device a high cosmetic grade and directing the platform to maneuver the user device to a third end location dedicated for undamaged and non-defective user devices.

18. The method of claim 17 further comprising:

determining that the screen is damaged when the control circuitry identifies at least a predetermined number of cracks on the screen depicted in the first image; and determining that the screen is defective when the control circuitry identifies at least a predetermined number of scratches on the screen depicted in the first image.

19. The method of claim 15 comprising:

positioning a second lighting element and a second imaging device such that light emitted from the second lighting element and a second field of view of the second imaging device form a right angle where the light emitted from the second lighting element and the second field of view meet at the user device when the user device is positioned at a second predetermined location and with a predetermined orientation;

activating the second lighting element;

instructing the second imaging device to capture a second image of a back of the user device while the user device is at the second predetermined location and in the predetermined orientation and the back of the user device is being illuminated by the second lighting element; and parsing the second image with the control circuitry to determine whether the back of the user device is defective.

20. The method of claim 19 further comprising:

rotating all sides of the user device through a third field of view of a third imaging device and light emitted by a third lighting element;

instructing the third imaging device to capture third images of the sides of the user device while the user device is being illuminated by the third lighting element;

parsing the third images to determine whether the sides of the user device are defective; and when the control circuitry determines that the back of the user device or the sides of the user device are defective, assigning the user device a low cosmetic grade and directing the platform to maneuver the user device to a second end location dedicated for user devices having defective backs or defective sides.

21. The method of claim 20 further comprising:

determining that the back of the user device or the sides of the user device are defective when the control circuitry identifies at least a predetermined amount cracks or scratches on the back of the user device depicted in the second image or the sides of the user device depicted in the third images.

22. The method of claim 20 further comprising:

when the control circuitry fails to determine that the back of the user device or the sides of the user device are defective, positioning a fourth lighting element and a fourth imaging device at a second angle relative to the platform such that light emitted from the fourth lighting element and a fourth field of view of the fourth imaging device form a right angle where the light emitted from the fourth lighting element and the fourth field of view meet at the user device when the user device is positioned at a third predetermined location on the platform;

activating the fourth lighting element;

instructing the fourth imaging device to capture a fourth image of the user device while the user device is at the third predetermined location and is being illuminated by the fourth lighting element;

parsing the fourth image with the control circuitry to determine whether the screen is defective;

when the control circuitry determines that the screen is defective, assigning the user device a medium cosmetic grade and directing the platform to maneuver the user device to a third end location dedicated for user devices having defective screens; and when the control circuitry fails to determine that the screen is defective, assigning the user device a high cosmetic grade and directing the platform to maneuver the user device to a fourth end location dedicated for undamaged and non-defective user devices.

23. The method of claim 22 further comprising:

determining that the screen is defective when the control circuitry identifies at least a predetermined number of scratches on the screen depicted in the fourth image.

* * * * *